Sept. 14, 1948.  P. H. DIKE ET AL  2,449,283
RECORDER WITH MAGNETICALLY POSITIONED
ELECTRIC INDICATOR
Filed Dec. 18, 1944  3 Sheets-Sheet 1
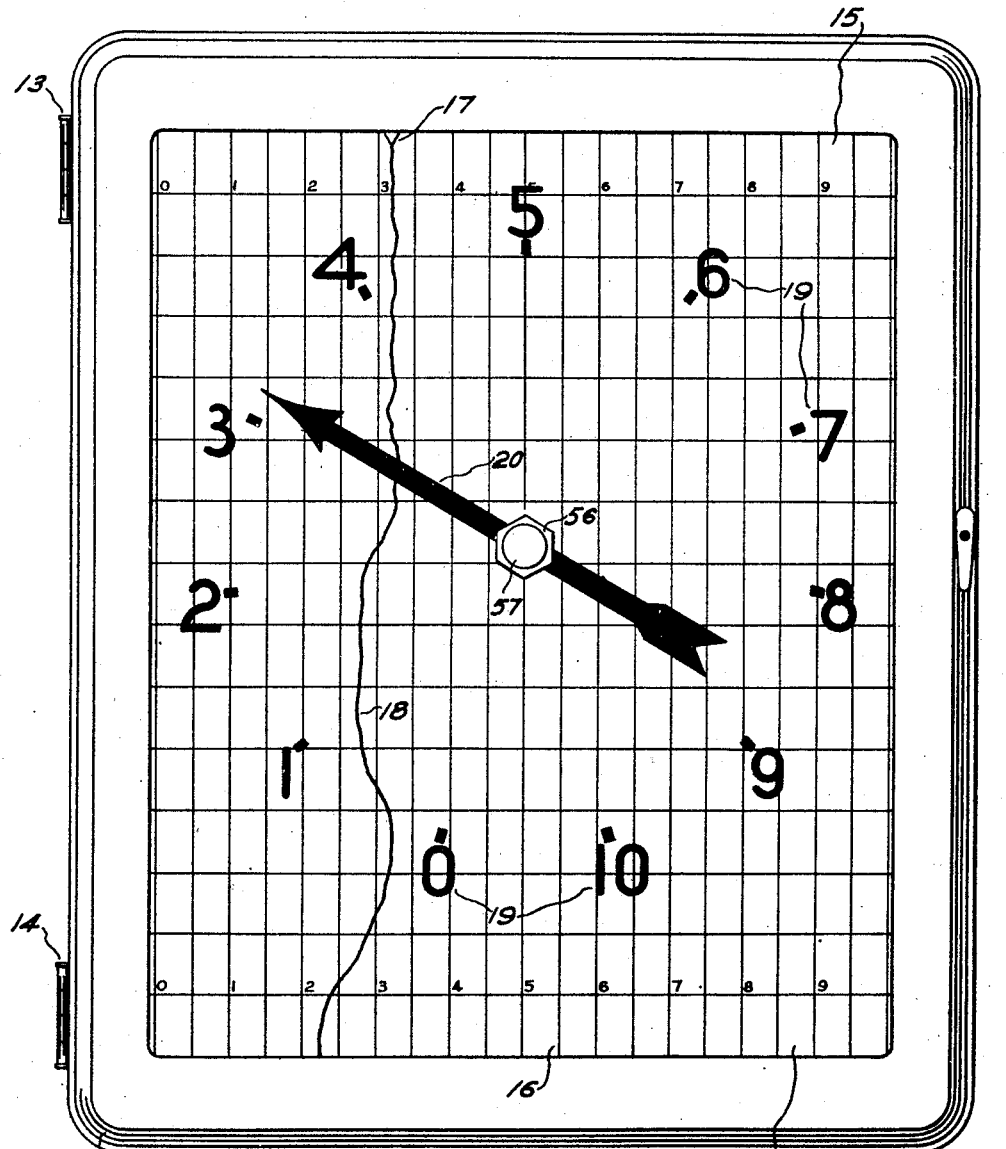
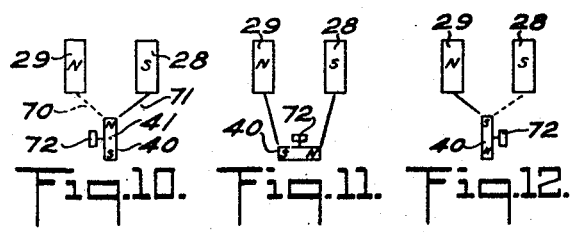
INVENTORS
PAUL H. DIKE
EDGAR D. DOYLE
BY
Virgil E. Woodcock
ATTORNEY Sept. 14, 1948.  P. H. DIKE ET AL  2,449,283
RECORDER WITH MAGNETICALLY POSITIONED
ELECTRIC INDICATOR
Filed Dec. 18, 1944  3 Sheets-Sheet 2
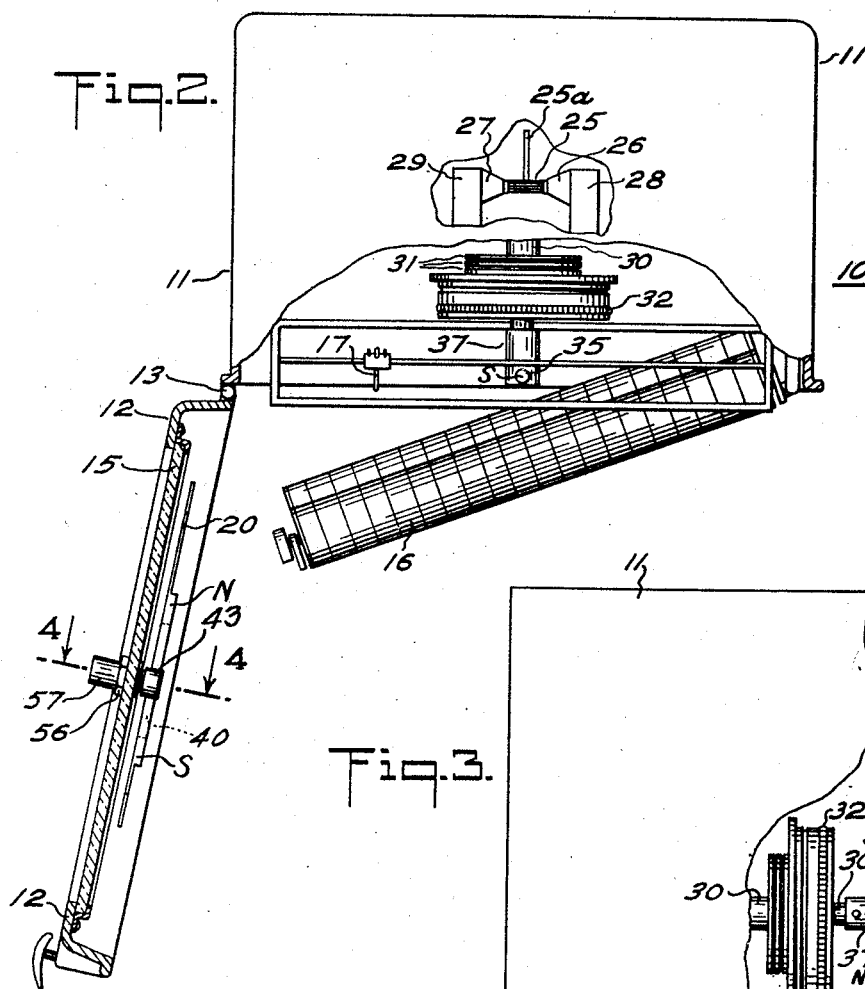
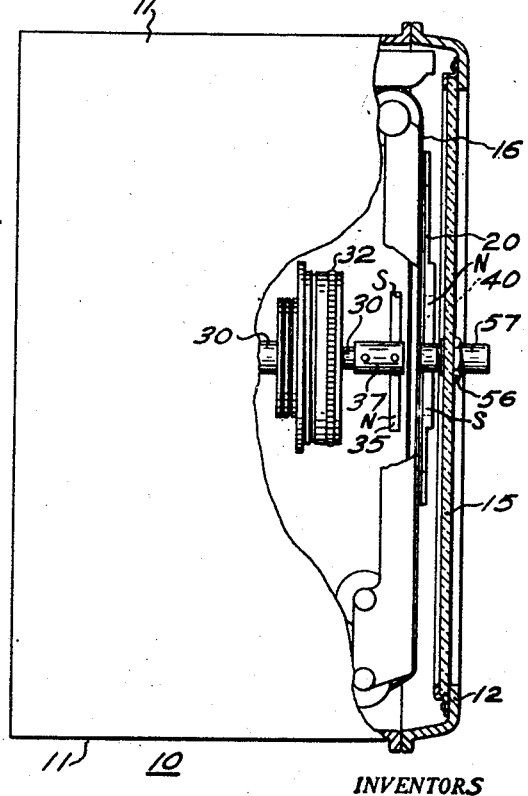
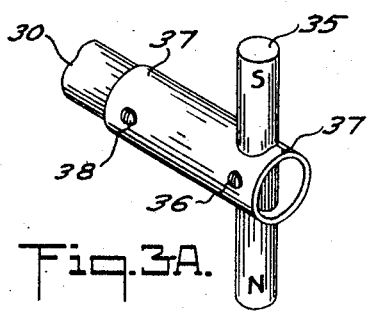
INVENTORS
PAUL H. DIKE
EDGAR D. DOYLE
BY
Virgil E. Woodcock
ATTORNEY

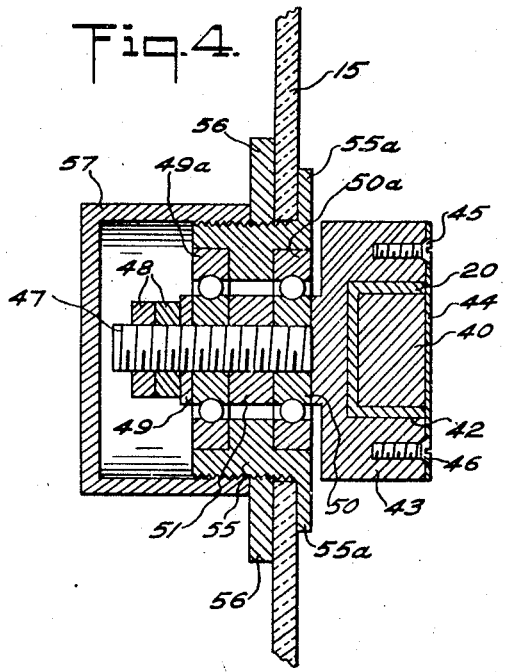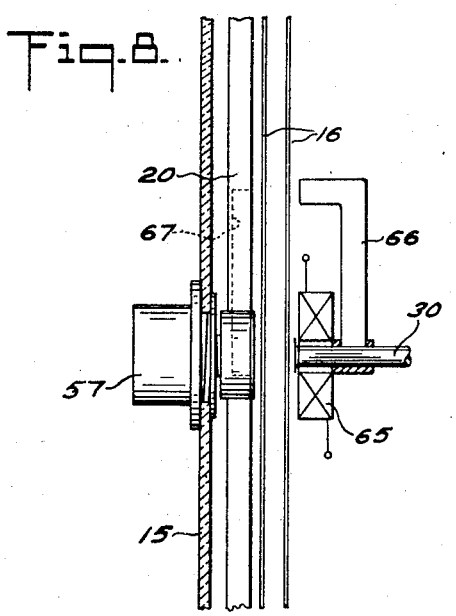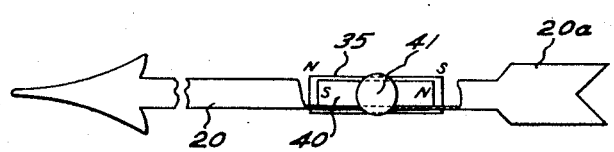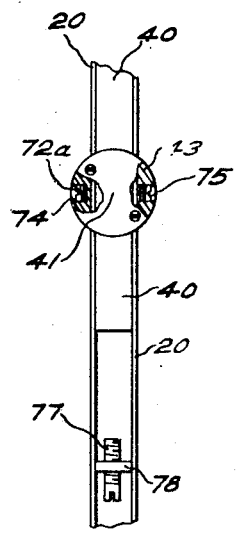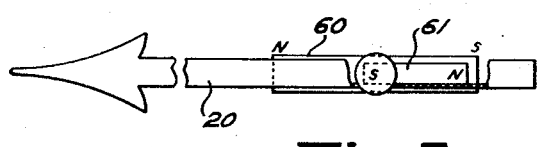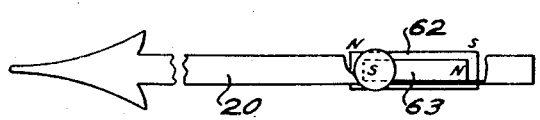

Patented Sept. 14, 1948

2,449,283

UNITED STATES PATENT OFFICE 2,449,283

RECORDER WITH MAGNETICALLY POSITIONED ELECTRIC INDICATOR

Paul H. Dike, Jenkintown, and Edgar D. Doyle, Philadelphia, Pa., assignors to Leeds and Northrup Company, Philadelphia, Pa., a corporation of Pennsylvania Application December 18, 1944, Serial No. 568,736

5 Claims. (Cl. 177—327)

1

This invention relates to recording instruments of the types in which a record is made on a strip chart and has for an object the provision of structure for converting the recorder into an instrument of the bold-indicating type.

Heretofore it has been proposed to convert recording instruments into bold-indicating instruments by adding an additional arm on which may be supported driving mechanism as well as the indicating pointer. Such an arrangement is shown in Ross Patent No. 2,074,117. Though such an instrument is satisfactory, it has the disadvantage of the need for a pivotal mounting of the arm as well as for a driving mechanism which must be operative through the pivotal connection. This driving mechanism must be kept of small size in order to take up as little room on the front of the indicating instrument as possible. This design requirement of small size of the parts is contrary to the designer's desire of larger parts which would provide greater accuracy in operation of the pointer. Moreover, it is necessary to actuate the driving mechanism from the mechanical relay or other form of instrument and this itself represents a substantial problem.

In accordance with the present invention, there is avoided a mechanical drive of the indirect type and there is provided a direct drive from the mechanical relay or instrument proper. This direct drive is provided, notwithstanding there is no physical or mechanical connection between the driving member of the mechanical relay and the pointer. The pointer is magnetically interlocked with the driving member as effectively as though it were splined together and also in manner such that they will always be in phase when in their operative position.

It has heretofore been proposed magnetically to couple a driving member and an indicating pointer together but such arrangements have not found great favor. In fact, they are not suitable except for applications where the driving and driven members are at the factory disposed in fixed phase relation one to the other. They have not been suitable, nor have they been used, for applications where the pointer and the driving member are temperorarily separated one from the other for the reason that magnetic couplings of the prior art do not maintain or provide a predetermined phase relation as between the driving member and the indicator, if the members have been separated and the phase relation therebetween disturbed or reversed.

In carrying out the present invention in one form thereof, the driving and driven members

2 comprising the mechanical relay and the pointer are respectively provided with magnetic members having a disposition and characteristics such as to produce the same phase relationship therebetween whenever the members are brought into cooperative relationship and notwithstanding prior relative positions, and notwithstanding the phase relationship existing when the two magnetic members are being brought into said cooperative relationship.

In accordance with a preferred arrangement of the invention, magnets are disposed on the driving and driven members with their axes of rotation so selected as to always insure a proper phase relation between the two. Thus, in accordance with the invention, though quite satisfactory for the purpose it is not essential that magnets of the aluminum-nickel-cobalt type be utilized.

When a measuring instrument is provided with a magnetic drive of the type above described, the presence of a stray magnetic field, such as may arise due to the presence of a permanent magnet associated with a galvanometer, may and is likely to produce a variable phase displacement of the index or pointer with respect to the driving element. Further in accordance with the invention, such a phase displacement is automatically compensated for by the application of a force to the index or pointer, which force upon rotation of the index is automatically varied both in magnitude and direction so as to reduce the variable displacement due to the presence of the stray magnetic field.

For a more complete understanding of the invention and for further objects and advantages thereof, reference should now be had to the accompanying description taken in conjunction with the drawings, in which:

Fig. 1 is a front view, on a reduced scale, of an instrument embodying the invention;

Fig. 2 is a top or plan view, partly in section, of an instrument of the type shown in Fig. 1;

Fig. 3 is a side elevation, partly in section, of the instrument of Fig. 2;

Fig. 3A is a perspective view of the driving magnet carried by a coupling for direct attachment to the relay mechanism of the instrument;

Fig. 4 is an enlarged sectional view taken on the line 4—4 of Fig. 2;

Fig. 5 is a fractional view of the pointer of Figs. 1–3;

Figs. 6 and 7 are fractional views of the pointer in accordance with further modifications of the invention;

Fig. 8 is a side view of the pointer and driving element in accordance with a further modification of the invention;

Fig. 9 illustrates a further modification of the invention which is applicable to each of the above modifications; and Figs. 10–13 diagrammatically illustrate the manner of compensating for the effect on the pointer of stray magnetic fields.

Referring to the drawings, the invention in one form has been shown as applied to a recorder 10 having a housing 11, Figs. 2 and 3, with a door 12 pivoted thereto by suitable hinges 13 and 14. These hinges may be of the type which not only pivotally support the door 12 but also which permit its entire removal or separation from the housing 11. The door 12 is provided with a relatively large glass window 15 through which may be seen a strip chart 16 with which is operatively associated a pen or stylus 17. This pen or stylus 17 traces on the chart a record 18 indicative of the magnitude of a condition under measurement.

It is obvious from an inspection of Fig. 1 that the curve or record 18 is relatively small and may not be seen at a very great distance. In order to provide an instrument of the bold-indicating type, a round scale 19 is carried by the window 15, which window also pivotally supports an index or pointer 20. This pointer 20 and the numerals forming a part of the scale 19 are exceedingly distinct and visible for substantial distances.

In certain applications of recording instruments it is desirable to open the door 12 and remove that part of the strip chart 16 which contains a record of the variations of a condition. Even where frequent removal of portions of the strip chart is not necessary, it is nevertheless required that a new strip chart be mounted in the recorder whenever the previous strip chart has been used up. In both cases, the opening of the door 12 moves the scale 19 and the index or pointer 20 away from the strip chart 16 and away from the actuating element of the condition-responsive means.

Though the invention is not limited thereto, there has been illustrated a fractional part of the sensitive actuating means disclosed in Squibb Patent No. 1,935,732. This actuating means, frequently referred to as a mechanical relay, includes a galvanometer coil 25 mounted between the pole pieces 26 and 27 which are in turn secured to the respective legs 28 and 29 of a permanent magnet. As fully described in said Squibb patent, the deflection of the galvanometer pointer 25a initiates rotation of a drive shaft 30 in a clockwise or counterclockwise direction, depending upon the sense and through an angle depending upon the extent of the deflection of the pointer 25a. As shown, the shaft 30 supports driving pulleys 31 for a violin string (not shown), which is attached to the pen 17 to control its movement across the strip chart 16. The shaft 30 also supports a slidewire 32.

In accordance with the invention, the shaft 30 extends from the slidewire toward the strip chart 16 and carries at its outer end a permanent magnet 35. As best shown in Fig. 3A, the permanent magnet 35 is held by a set screw 36 in fixed position within a coupling member 37. By means of an additional set screw 38 this coupling member 37 is adjustably secured to the shaft 30. In this form of the invention, the permanent magnet 35 is of a type which has an exceedingly high coercive force, that is, which strongly resists any effort to reverse its polarity. One example of a suitable magnetic material for this purpose is that now available on the market under a well-known trade name. Of course, any suitable magnet material may be utilized providing the magnet has a high coercive force, for example, above 450 and preferably around 700 to 800, the typical coercive force of typical aluminum-nickel-cobalt magnets. The magnet material may comprise a hardened alloy of about from 6% to 15% aluminum, from 20% to 30% nickel, with the remainder substantially iron, or including cobalt.

A similar permanent magnet 40 is carried by the pointer or index 20. As best shown in Fig. 5, the driving permanent magnet 35 and the driven permanent magnet 40 are similarly disposed with respect to the axis of rotation indicated by the dot 41. The opposite poles of permanent magnets 35 and 40 strongly attract each other and normally they assume positions as close together as possible, that is, the driven magnet 40 will be moved to a position where the south pole thereof is at its shortest distance from the north pole of the driving magnet 35. Similarly, the north pole of magnet 40 will normally be retained at its shortest distance from the south pole of the driving magnet 35. Otherwise stated, the two magnets tend always to remain with their magnetic axes parallel to each other but with opposite polarities.

The assembly of the pointer 20 and the driven permanent magnet 40, is carried by the transparent window 15 of the door or closure 12. As best shown in Figs. 3 and 4, the pointer 20 may at its midportion be of rectangular shape so as to nest within a rectangular opening 42, formed in a supporting member 43. The permanent magnet 40, illustrated as being rectangular in cross section, nests within the rectangular section of the pointer 20. The pointer and the permanent magnet 40 are held in fixed position by means of a clamping plate 44 secured to the member 43 by means of screws 45 and 46. The member 43 is provided with a threaded extension 47 on which there is secured by means of lock nuts 48, ball bearing races 49 and 50 together with a spacer 51. The outer sections 49a and 50a are supported by a bushing 55, having a flange 55a disposed on the inner side of the window 15 and a threaded section to receive a lock nut 56 on the front side of the window 15. The front portion of this assembly is enclosed by means of a cap 57. This arrangement has the advantage of providing two bearing supports of the ball bearing type spaced from each other and yet taking up a minimum of space on the instrument itself. It also minimizes friction and provides a highly satisfactory mounting for the pointer.

Assuming the parts are in the position shown in Fig. 3, it will, of course, be understood that the polarities of the respective magnets are as shown in Fig. 5 with opposite poles adjacent each other. If now the door 12 is opened, for example to a position as shown in Fig. 2, the pointer 20 may be moved to any position. If it is touched, accidentally or purposely, it will rotate until it comes to rest in an indeterminate position. Should it be rotated 180° with respect to its former position, upon closure of the door 12, it will be understood that like poles of the magnet 40 will approach like poles of the magnet 35. With such a phase relation, the difficulty in the past has been that one magnet would reverse the polarity of the other magnet and, hence, the index or pointer would be retained in a position 180° out of the desired relationship with respect to the driving member. However, by utilizing magnets of high coercive force, neither magnet reverses polarity. On the contrary, there is a strong repulsion at opposite ends of the magnets which produces rotation of the pointer 20 through 180°.

As the ends of opposite polarities of the respective magnets approach each other, the driven magnet 40 is brought quickly to standstill in the correct phase relationship with respect to the driving magnet 35. Thereafter the pointer 20 and the driven magnet 40 are magnetically locked into driving relationship with the driving magnet 35 and the drive shaft 30. As the condition under measurement varies, the shaft 30 will rotate in one direction or the other accurately to position the pointer 20 with reference to the scale 19. Because of the direct driving relationship, errors are minimized and irrespective of the prior relative positions of the index and scale when the door is in the open position, the pointer will always be returned to its correct position on the scale upon closure of the door 12.

Though magnets of the high coercive-force type have been found satisfactory and suitable for a preferred form of the invention, it is to be understood the present invention is not limited thereto. In accordance with the modification of Fig. 6, the driving magnet 60 may be a permanent magnet of either low or high coercive force and the driven magnet 61 may also be a permanent magnet of low or high coercive force. Reversal of polarity or reversal of phase is avoided by pivotally mounting one magnet with one end thereof near the axis of rotation while the other permanent magnet is mounted with its ends substantially symmetrical with respect to the axis of rotation. Thus, it will be apparent at once that the free end of the magnet pivoted at its end will be attracted by one end of the other magnet and repelled by the opposite end thereof. Thus, the magnetic driving relationship may be established with the free end in but one position. The magnet which is pivoted at one end is not subjected to a magnetic field which tends to reverse its polarity, because only one pole of it is affected by the magnetic field of the associated magnet.

As shown in Fig. 6, the driven magnet 61 is carried by the pointer 20 so that one end of magnet 61 rotates about the axis of rotation with the free end thereof cooperating with one pole of the magnet 60 whose free ends are symmetrically disposed with respect to the axis of rotation.

This arrangement has the advantage that the unbalanced weight of the driven magnet 61 is utilized to counterbalance the weight of the left-hand end of the pointer 20 whereas in Fig. 5 the large end 20a is provided for that purpose. Of course, in both cases, added weight or weights may be provided to supplement the effect.

In accordance with the modification of Fig. 7, both the driving magnet 62 and the driven magnet 61 are mounted at one end for rotation about the axis of rotation. This arrangement has the advantage that like poles may never be brought adjacent each other and hence there never arises a demagnetizing force of any kind, as between the two magnets. On the other hand, the magnetic driving relationship between the two magnets is definitely fixed and the phase therebetween is always the same regardless of the prior position of the pointer 20 before being moved into cooperative relationship with the driving magnet 62.

Now that the principles of the invention have been explained, it will be understood that further modifications may be made utilizing these principles. As illustrative of one further modification, there has been shown in Fig. 8 a magnet coil 65 arranged to encircle the end of the drive shaft 30. Attached to the drive shaft 30 is an L-shaped arm 66, preferably of soft steel and arranged with its free end adjacent the strip chart 16. A driven member 67, preferably of soft steel, is supported by the pointer 20 and with one end of the member 67 mounted for rotation about the axis of rotation. This arrangement is generally similar to that of Fig. 7. The difference is that the driving connection is magnetically produced by the energization of the magnet coil 65.

It will be observed that the coil will produce a magnetic flux which extends through a magnetic path including the left-hand end of shaft 30, the L-shaped member 66, through the air gap, thence through the driven member 67 and through a second air gap to the left-hand end of shaft 30. As in the modification of Fig. 7, the driving relationship will be established for only one phase relation as between the pointer 20 and the driving member 66. Either direct or alternating current may be used for energization of the coil 65.

Further in accordance with the invention, it has been found desirable to provide means for correcting for the effects of stray magnetic fields which may occur due to the environment in which the instruments are utilized and sometimes due to the inclusion in the recording instruments of stationary permanent magnets and the like. For example, in Fig. 2 the respective legs 28 and 29 of the permanent magnet produce a strong magnetic flux across the galvanometer coil 25. The leakage flux from this permanent magnet, in the absence of shielding and the like, introduces an error when the axis of the driven magnet is perpendicular to the direction of the stray field.

As previously explained, the direct drive between the mechanical relay and the pointer greatly increases the accuracy with which the pointer 20 may be driven with respect to the scale 19. Because of the greater permissible accuracy, even a small deflection of the pointer 20 due to stray fields may introduce an error, which in terms of permissible accuracy, may be considered appreciable. Accuracies of the degree which have been obtained in accordance with the invention have not heretofore been possible with bold-indicating instruments. For convenience, the aforesaid error will be assumed to be due to the stray magnetic flux from the permanent magnet whose poles 28 and 29 have been illustrated in Fig. 2. These have been reproduced in Figs. 10-13 with the driven magnet 40 in different angular positions with respect thereto.

For example, in Fig. 10 the driven magnet 40 is disposed at right angles to the direction of the stray flux between the north pole 29 and the south pole 28. It will be observed that the north pole of the magnet 40 is adjacent the south and north poles 28 and 29. Therefore, a repulsion force is developed between the two north poles as indicated by the broken line 70 while an attractive force is developed between the north and south poles as indicated by the solid line 71. These two forces act in the same direction and tend to rotate the permanent magnet 40 in a clockwise direction about the axis of rotation 41.

In accordance with the invention, a counterweight, as indicated at 72, is provided to apply torque opposed to the magnetic torque produced as the result of the reaction of the stray field with that of the north pole of the magnet 40. Of course, the south pole of the driven magnet 40 is attracted to the north pole 29 and repelled by the south pole 28. The forces, however, acting upon the south pole of the magnet 40 are less than those acting upon the north pole thereof. Consequently, the cause of the error introduced has been represented by the lines 70 and 71 which lead to the north pole of the magnet 40. The effect of these forces is to apply a torque to the permanent magnet 40 in a direction to rotate it in a clockwise direction. This torque is opposed by providing a counterweight 72 which by gravity applies a torque in the opposite direction. As the driven magnet 40 is rotated in a clockwise direction, as by the driving magnet 35 of Figs. 1–5, the net torque due to the stray field action decreases. But as the driven magnet 40 rotates in a clockwise direction the torque applied by the counterweight 72 also decreases. Hence, there is at all times compensation therefor.

This will be seen by reference to Fig. 11, where the north pole of the driven magnet 40 is attracted by the south pole 28 while the south pole of the driven magnet 40 is attracted by the north pole 29. The distances between the respective north and south poles are equal. Therefore, there is no resultant torque applied to the driven magnet 40. However, the counterweight 72 then occupies a vertical position and does not apply a corrective torque to the driven magnet 40.

In Fig. 12, the driven magnet 40 occupies a position 180° from that shown in Fig. 10. In this case, the action has been reversed as between the south pole of the magnet 40 and the north and south poles 29 and 28 of the permanent magnet. In this case, the torque is in a direction to rotate the permanent magnet 40 in a counterclockwise direction. However, the counterweight 72 now acts in a direction to apply torque in a clockwise direction to the magnet 40 to compensate therefor.

Finally, in Fig. 13 the driven magnet 40 is shown in a position 180° from that of Fig. 11. The respective north poles and the respective south poles repel each other and thus neutralize their effects on the magnet 40. The counterweight 72 then occupies a position directly below the axis of rotation and, hence, does not apply a corrective torque to the driven magnet 40. Thus, regardless of the position of the driven magnet 40 the provision of a simple counterweight 72 automatically compensates and applies a variable corrective torque which neutralizes the effect of the stray field from the north and south poles 29 and 28 of the permanent magnet.

The counterweight 72 may take the form of a simple screw 72a, as illustrated in Fig. 9. This screw 72a may be adjusted in a threaded opening 74 provided in the supporting member 43. By means of a screw driver the screw 72a may be adjusted to correct for the particular stray field which may be introducing error into the reading of the pointer 20 with respect to the scale. In the event the stray field acts in the opposite direction, a further counterweight, in the form of a threaded screw 75, may be provided on the opposite side of the axis of rotation 41. If desired, either or both of the counterweights 72a and 75 may be adjusted to introduce the required corrective torques.

In the event the stray field, due to a power conductor, or from some other source, acts upon the driven magnet 40 in a direction normal to that illustrated in Figs. 10–13, it will apply a torque to the pointer 20 which will be maximum when the pointer 20 is horizontal, as viewed in Figs. 10–13, or as shown in Figs. 11–13. Hence, a compensating torque may be applied by the provision of a counterweight adjustable along the length of the pointer 20. It may take the form of an adjustable screw 77, Fig. 9, carried by a threaded support 78. The screw 77 may be adjusted to a position to compensate for the torque due to such a stray field. Hence, the counterweight 72a will take care of stray fields in the horizontal direction and the counterweight 77 will take care of stray fields in a vertical direction. The two counterweights 72a and 77 may be adjusted to take care of all other stray fields or combinations of fields disposed therebetween.

While preferred embodiments of the invention have been described, it will be understood that further modifications may be made without departing from the scope and spirit of the invention as set forth in the appended claims.

What is claimed is:

1. In an indicating instrument having a rotatable index movable along a circular scale, a magnetic drive for said index comprising a driving permanent magnet symmetrically supported for rotation about the axis of rotation of said index but in spaced relation therewith and a driven member carried by said index and symmetrically disposed with respect to said axis, means for compensating for the effects of torque produced by stray magnetic fields on said magnetic drive which tend to produce variable displacements of said index comprising at least one counterweight attached to said index which gravitationally unbalances said index to apply a counter-torque which for all angular positions of said index is equal and opposite to said torque produced by said stray fields.

2. In a measuring instrument having means for supporting a driving element enclosed within a housing, an index supported for rotation in front of said driving element, and magnetic means forming a magnetic driving connection between said driving element and said index which connection by the presence of a stray magnetic field has a variable phase displacement of said index with respect to said driving element, the method of automatically compensating for the effect of said stray magnetic field which causes said variable phase displacement which comprises applying a force to said index and upon rotation of said index automatically varying the magnitude and direction of said force so as to reduce variable displacement of said index by said stray magnetic field.

3. In a measuring instrument having means for supporting a driving element enclosed within a housing, an index supported for rotation in front of said driving element, and magnetic means forming a magnetic driving connection between said driving element and said index and subject to variable displacement due to the presence of a stray magnetic field, the method of gravitationally producing a corrective torque to correct for said variable displacement which comprises applying by gravity a torque to said index, and during rotation of said index varying said torque in direction and magnitude to compensate for the torque produced by said stray magnetic field.

4. In an indicating instrument including a stationary permanent magnet and having a rotatable index movable along a circular scale, a magnetic drive for said index comprising a driving permanent magnet symmetrically supported for rotation about the axis of rotation of said index but in spaced relation therewith, a driven permanent magnet carried by said index and symmetrically disposed with respect to said axis, means for compensating for the effects of torque on said driven magnet produced by the magnetic field from said stationary magnet comprising at least one counterweight attached to said index which gravitationally unbalances said index to apply a countertorque which for all angular positions of said index is equal and opposite to said torque produced on said driven magnet by the field of said permanent magnet.

5. In a measuring instrument having a driving element disposed within a housing and movable in response to changes in the magnitude of a condition, the combination of a scale and an index relatively rotatable about an axis, a door for said housing supporting said scale and said index, means for producing relative movement between said scale and said index comprising a magnet rotatably supported on said door and a second magnet carried by said driving element, one end of at least one of said magnets being disposed at said axis with the outer other end thereof adjacent an end of the other magnet to produce a predetermined phase relationship between said index and said scale irrespective of the relative positions of said index and said scale with said door in its open position.

PAUL H. DIKE.
EDGAR D. DOYLE.

REFERENCES CITED

The following references are of record in the file of this patent:

UNITED STATES PATENTS

| Number | Name | Date |
|---|---|---|
| 985,456 | Rypinski | Feb. 28, 1911 |
| 1,174,787 | Wilkinson | Mar. 7, 1916 |
| 2,074,116 | Stein | Mar. 16, 1937 |
| 2,074,117 | Ross | Mar. 16, 1937 |
| 2,124,832 | Schofield | July 26, 1938 |
| 2,217,609 | Bierman | Oct. 8, 1940 |
| 2,225,032 | Carbonara | Dec. 17, 1941 |
| 2,297,233 | Meer | Sept. 29, 1942 |
| 2,307,912 | Bean et al. | Jan. 12, 1943 |
| 2,312,990 | Miller | Mar. 2, 1943 |
| 2,355,237 | Pethes | Aug. 8, 1944 |
| 2,371,511 | Faus | Mar. 13, 1945 |
| 2,417,339 | Woolley | Mar. 11, 1947 |